United States Patent
Hara et al.

(10) Patent No.: US 10,409,136 B2
(45) Date of Patent: Sep. 10, 2019

(54) OPTICAL MODULATOR

(71) Applicant: Sumitomo Osaka Cement Co., Ltd, Tokyo (JP)

(72) Inventors: Tokutaka Hara, Tokyo (JP); Norikazu Miyazaki, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/514,505

(22) PCT Filed: Mar. 10, 2016

(86) PCT No.: PCT/JP2016/057520
§ 371 (c)(1),
(2) Date: Mar. 25, 2017

(87) PCT Pub. No.: WO2016/158283
PCT Pub. Date: Oct. 6, 2016

(65) Prior Publication Data
US 2018/0307116 A1 Oct. 25, 2018

(30) Foreign Application Priority Data

Mar. 31, 2015 (JP) ................. 2015-071835

(51) Int. Cl.
*G02F 1/225* (2006.01)
*G02F 1/01* (2006.01)
*G02F 1/21* (2006.01)

(52) U.S. Cl.
CPC ............ *G02F 1/225* (2013.01); *G02F 1/0123* (2013.01); *G02F 2001/212* (2013.01);
(Continued)

(58) Field of Classification Search
CPC .................................................... G02F 1/225
See application file for complete search history.

(56) References Cited

U.S. PATENT DOCUMENTS

| 5,862,279 A | 1/1999 | Amersfoort et al. |
| 7,697,846 B2 | 4/2010 | Shoji et al. |
| 8,244,075 B2 | 8/2012 | Sugiyama |

FOREIGN PATENT DOCUMENTS

| JP | H08509079 A | 9/1996 |
| JP | H09211403 A | 8/1997 |

(Continued)

OTHER PUBLICATIONS

Thach Giang Nguyen, Efficient Resonantly Enhanced Mach-Zehnder Optical Modulators on Lithium Niobate, Dissertation (Year: 2006).*

(Continued)

*Primary Examiner* — Peter Radkowski
(74) *Attorney, Agent, or Firm* — Greer, Burns & Crain, Ltd.

(57) ABSTRACT

Provided is an optical modulator in which degradation of an extinction ratio is suppressed and a temperature drift phenomenon is suppressed.
An optical modulator includes: a substrate having an electro-optic effect; an optical waveguide formed on the substrate; and a control electrode for controlling light waves propagating through the optical waveguide, in which the optical waveguide has one or more Mach-Zehnder type optical waveguides (A1 to A3 and B1 to B3), the control electrode has DC electrodes (C1 to C4) which apply DC bias, a feeder electrode which feeds DC bias to the DC electrode crosses one of two branched waveguides of the Mach-Zehnder type optical waveguide, and a first dummy electrode (a dotted line E5 or E6) is provided at a specific position on the other one of the two branched waveguides, which is a specific position symmetrical in relation to a position at which the feeder electrode crosses the one of the two branched waveguides.

5 Claims, 3 Drawing Sheets

(52) U.S. Cl.
CPC ...... *G02F 2201/12* (2013.01); *G02F 2202/20* (2013.01); *G02F 2203/21* (2013.01)

(56) References Cited

FOREIGN PATENT DOCUMENTS

| | | | | |
|---|---|---|---|---|
| JP | 2005244655 | A | * | 9/2005 |
| JP | 2005244655 | A | | 9/2005 |
| JP | 2007025370 | A | * | 2/2007 |
| JP | 2007025370 | A | | 2/2007 |
| JP | 2009162933 | A | * | 7/2009 |
| JP | 2009162933 | A | | 7/2009 |
| JP | 2009181108 | A | | 8/2009 |
| JP | 2011028014 | A | | 2/2011 |

OTHER PUBLICATIONS

International Search Report of PCT/JP2016/057520 dated May 31, 2016.

* cited by examiner

OPTICAL MODULATOR

TECHNICAL FIELD

The present invention relates to an optical modulator and in particular, to an optical modulator having a substrate having an electro-optic effect, an optical waveguide formed on the substrate, and a control electrode for controlling light waves propagating through the optical waveguide.

BACKGROUND ART

In an optical communication field and an optical measurement field, an optical modulator is used. As the optical modulator, an optical modulator in which an optical waveguide and a control electrode for controlling light waves propagating through the optical waveguide are formed on a substrate having an electro-optic effect, such as lithium niobate (LN), is used. As shown in Patent Literature No. 1, an optical modulator having a configuration in which a modulation electrode which inputs a RF modulation signal and a DC electrode which applies a DC bias voltage are separately formed as a controlled electrode, is known.

Further, as a substrate configuring an optical modulator, there are an X-cut type substrate and a Z-cut type substrate, and in the X-cut type substrate, an electric field in a direction parallel to the surface of the substrate is applied to an optical waveguide, and in the Z-cut type substrate, an electric field in a direction perpendicular to the surface of the substrate is applied to an optical waveguide. In particular, in the Z-cut type substrate, it is necessary to form a control electrode directly above the optical waveguide, and in order to prevent light waves propagating through the optical waveguide from being absorbed by the control electrode, a buffer layer is provided between the optical waveguide and the control electrode.

In contrast, in the X-cut type substrate, control electrodes are disposed so as to put both side of the optical waveguide therebetween, and therefore, it is not necessary to provide a buffer layer. However, resulting from the wiring pattern of a feeder electrode of the control electrode, the feeder electrode inevitably crosses the optical waveguide, and therefore, some of light waves propagating through the optical waveguide are absorbed by the feeder electrode.

FIG. 1 is a diagram showing an example of a DC electrode formed on the X-cut type substrate. FIG. 1 shows an optical modulator in which two Mach-Zehnder type waveguides are disposed side by side. For example, a part of a nested optical waveguide is shown in which sub-Mach-Zehnder type optical waveguides (branched waveguides of the sub-Mach-Zehnder type optical waveguides are A1 and A2, and B1 and B2) are incorporated into two branched waveguides (A3 and B3) of a main Mach-Zehnder type optical waveguide in a nested manner.

At the Mach-Zehnder type optical waveguides (A1 to A3) on one side, DC electrodes (C1 and C2) are formed so as to put both side of each optical waveguide therebetween, and each of DC bias voltages (V1 and V2) is applied to each of the DC electrodes (C1 and C2). Further, at the Mach-Zehnder type optical waveguides (B1 to B3) on the other side, DC electrodes (C3 and C4) are formed so as to put both side of each optical waveguide therebetween, and each of DC bias voltages (V3 and V4) is applied to each of the DC electrodes (C3 and C4).

In the DC electrode of FIG. 1, for example, at locations shown by dotted line E1 and a dotted line E2, the feeder electrode crosses the optical waveguides (A1 and B1). For this reason, some of light waves propagating through the optical waveguide (A1) are absorbed by the feeder electrode, and thus the intensity of light becomes different at the branched waveguide A1 and the branched waveguide A2, and thus this causes degradation of an extinction ratio combining the two lights. The same applies to the optical waveguides (B1 to B3). In particular, in an optical modulator in which a plurality of Mach-Zehnder type optical waveguides are incorporated, as in the nested optical waveguide or the like, an advanced modulation technique such as high-frequency modulation or multi-level modulation is used, and thus even a slight degradation of the extinction ratio causes significantly influencing the characteristics of the optical modulator.

Further, in a case where the power supply to the DC electrode is performed from one side of the optical modulator, or the like, the disposition of the feeder electrode tends to become asymmetric with respect to symmetric axis of the optical waveguide (in the case of the Mach-Zehnder type optical waveguide, a line passing through the middle between two branched waveguides) due to the wiring pattern of the feeder electrode of the DC electrode. In FIG. 1, a feeder electrode is not present in a portion (a dotted line E4) symmetrical to a feeder electrode portion shown by a dotted line E3. Such asymmetry causes different of internal stress of the electrode (the feeder electrode) on the optical waveguide at each optical waveguide, thereby causing further degradation of the extinction ratio due to a change in the mode field diameter of each optical waveguide, or a temperature drift phenomenon (a phenomenon in which the operating point of the Mach-Zehnder type optical waveguide is shifted due to a change in temperature).

CITATION LIST

Patent Literature

[Patent Literature No. 1] Japanese Laid-open Patent Publication No. 2005-244655

SUMMARY OF INVENTION

Technical Problem

An object of the present invention is to solve the problems as described above and provide an optical modulator in which degradation of an extinction ratio is suppressed and a temperature drift phenomenon is suppressed.

Solution to Problem

In order to solve the above problems, an optical modulator according to the present invention has the following technical features.

(1) An optical modulator includes: a substrate having an electro-optic effect; an optical waveguide formed on the substrate; and a control electrode for controlling light waves propagating through the optical waveguide, and the optical waveguide has at least one Mach-Zehnder type optical waveguide, the control electrode has a DC electrode which applies DC bias, a feeder electrode which feeds DC bias to the DC electrode crosses one of two branched waveguides of the Mach-Zehnder type optical waveguide, and a first dummy electrode is provided at a specific position on the other one of the two branched waveguides, which is a specific position symmetrical in relation to a position at which the feeder electrode crosses the one of the two branched waveguides.

(2) In the optical modulator according to the above (1), the optical waveguide has at least two Mach-Zehnder type optical waveguides disposed side by side with each other, a part of one of the two Mach-Zehnder type optical waveguides is crossed by the feeder electrode and the first dummy electrode, and a second dummy electrode is provided at a specific position on the other one of the two Mach-Zehnder type optical waveguides, which is a specific position symmetrical in relation to a position at which the feeder electrode and the first dummy electrode cross the one of the two Mach-Zehnder type optical waveguides.

(3) In the optical modulator according to the above (1) or (2), in the feeder electrode or the dummy electrode which crosses the optical waveguide, a width of a portion which crosses the optical waveguide is made to be narrower than a width of each of portions in front of and behind the portion which crosses the optical waveguide.

(4) In the optical modulator according to any one of the above (1) to (3), the feeder electrode has a parallel feeder electrode portion which is disposed parallel to a drawing direction of the Mach-Zehnder type optical waveguide, and a third dummy electrode having approximately the same shape is formed at a position symmetrical to the parallel feeder electrode portion with respect to a central axis which is parallel to the drawing direction and becomes an axis of symmetry of the Mach-Zehnder type optical waveguide.

(5) In the optical modulator according to any one of the above (1) to (4), the dummy electrode is electrically connected to the DC electrode.

Advantageous Effects of Invention

According to the present invention, the optical modulator includes a substrate having an electro-optic effect, an optical waveguide formed on the substrate, and a control electrode for controlling light waves propagating through the optical waveguide, in which the optical waveguide has at least one Mach-Zehnder type optical waveguide, the control electrode has a DC electrode which applies DC bias, a feeder electrode which feeds DC bias to the DC electrode crosses one of two branched waveguides of the Mach-Zehnder type optical waveguide, and a first dummy electrode is provided at a specific position on the other one of the two branched waveguides, which is a specific position symmetrical in relation to a position at which the feeder electrode crosses the one of the two branched waveguides. Therefore, the propagation loss of light waves due to each branched waveguide can be set to approximately the same level, and thus it is possible to suppress degradation of an extinction ratio of the optical modulator.

Further, the feeder electrode has a parallel feeder electrode portion which is disposed parallel to a drawing direction of the Mach-Zehnder type optical waveguide, and another dummy electrode (a third dummy electrode) having approximately the same shape is formed at a position symmetrical to the parallel feeder electrode portion with respect to a central axis which is parallel to the drawing direction and becomes an axis of symmetry of the Mach-Zehnder type optical waveguide. Therefore, internal stress is equally applied to the branched waveguides by the DC electrodes, and therefore, it is also possible to suppress occurrence of a temperature drift phenomenon.

DESCRIPTION OF EMBODIMENTS

Hereinafter, an optical modulator according to the present invention will be described in detail by using preferred embodiments.

Figure 1:
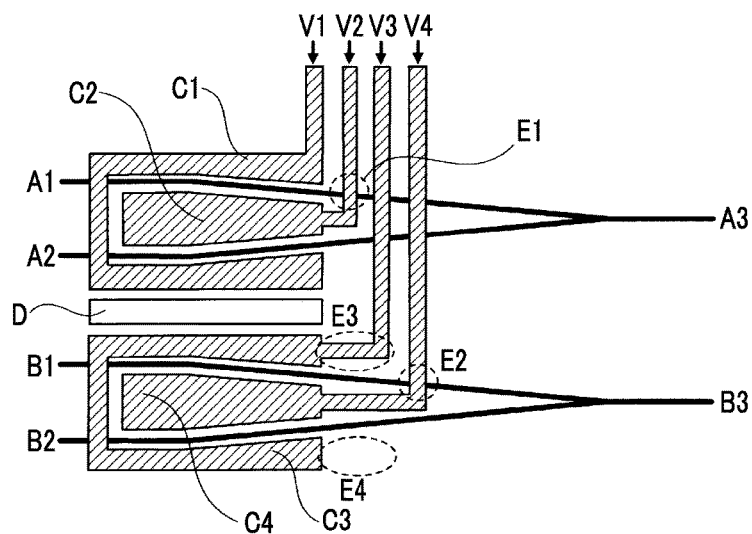
FIG. 1 is a diagram for describing the configuration of a DC electrode of the related art.
Figure 2:
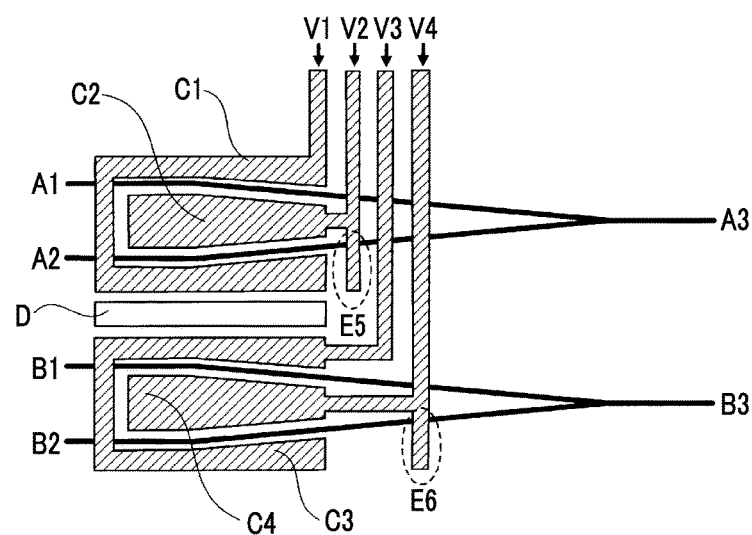
FIG. 2 is a diagram for describing a first example relating to an optical modulator according to the present invention.

As shown in FIG. 2, the optical modulator according to the present invention includes: a substrate having an electro-optic effect; an optical waveguide formed on the substrate; and a control electrode for controlling light waves propagating through the optical waveguide, in which the optical waveguide has one or more Mach-Zehnder type optical waveguides (A1 to A3, and B1 to B3), the control electrode has DC electrodes (C1 to C4) which apply DC bias, a feeder electrode which feeds DC bias to each of the DC electrodes crosses one of two branched waveguides of the Mach-Zehnder type optical waveguide, and a first dummy electrode (a dotted line E5 or E6) is provided at a specific position on the other one of the two branched waveguides, which is a specific position symmetrical in relation to a position at which the feeder electrode crosses the one of the two branched waveguides.

As the substrate which is used in the optical modulator according to an aspect of the present invention, a substrate having an electro-optic effect, such as a single crystal of any one of $LiNbO_3$, $LiTaO_5$, and PLZT (lead lanthanum zirconate titanate), a semiconductor such as InP, or a polymer, can be suitably used. In particular, $LiNbO_3$ and $LiTaO_5$ which are frequently used in an optical modulator may be used. The optical modulator according to an aspect of the present invention is more suitably applied to an optical modulator using an X-cut type substrate. However, even in a Z-cut type substrate, in a case where a propagation loss occurs due to a control electrode or a case where a temperature drift phenomenon occurs, the optical modulator according to an aspect of the present invention may be applied thereto.

The optical waveguide is formed on the substrate. The optical waveguide which is formed on the substrate is formed by thermally diffusing titanium (Ti) or the like onto, for example, a $LiNbO_3$ substrate (an LN substrate). Further, a ridge type optical waveguide in which concavity and convexity are formed on a substrate along an optical waveguide can also be used. As a pattern shape of the optical waveguide, various shapes such as a nested waveguide which is provided with at least one Mach-Zehnder type waveguide and made by combining, for example, a plurality of Mach-Zehnder type waveguides can be adopted according to the use of the optical modulator.

The control electrode can be formed by forming an electrode pattern of Ti.Au on the surface of the substrate and by using a gold plating method or the like. A dummy electrode in an aspect of the present invention is difficult applied to a modulation electrode which applies a RF modulation signal, and may be applied to only a DC electrode.

The DC electrode is composed of a hot electrode (C2 or C4) and a ground electrode (C1 or C3), as shown in FIG. 2. A ground electrode is separately disposed between the Mach-Zehnder type optical waveguides adjacent to each other, as shown by a symbol D of FIG. 2. Due to such a configuration, an electric field generated by the DC electrode provided in the Mach-Zehnder type optical waveguide is prevented from affecting the DC electrode of the other optical waveguide.

In FIG. 2, the dummy electrodes (dotted lines E5 and E6) is provided at a part of the feeder electrode of the hot electrodes (C2 and C4), thereby allowing the propagation loss of the guided light to be set to approximately the same level between the branched waveguides A1 and A2, or between the branched waveguides B1 and B2. The dummy electrode can be provided in not only the hot electrode (C2 or C4), but also the ground electrode (C1 or C3).

Figure 3:
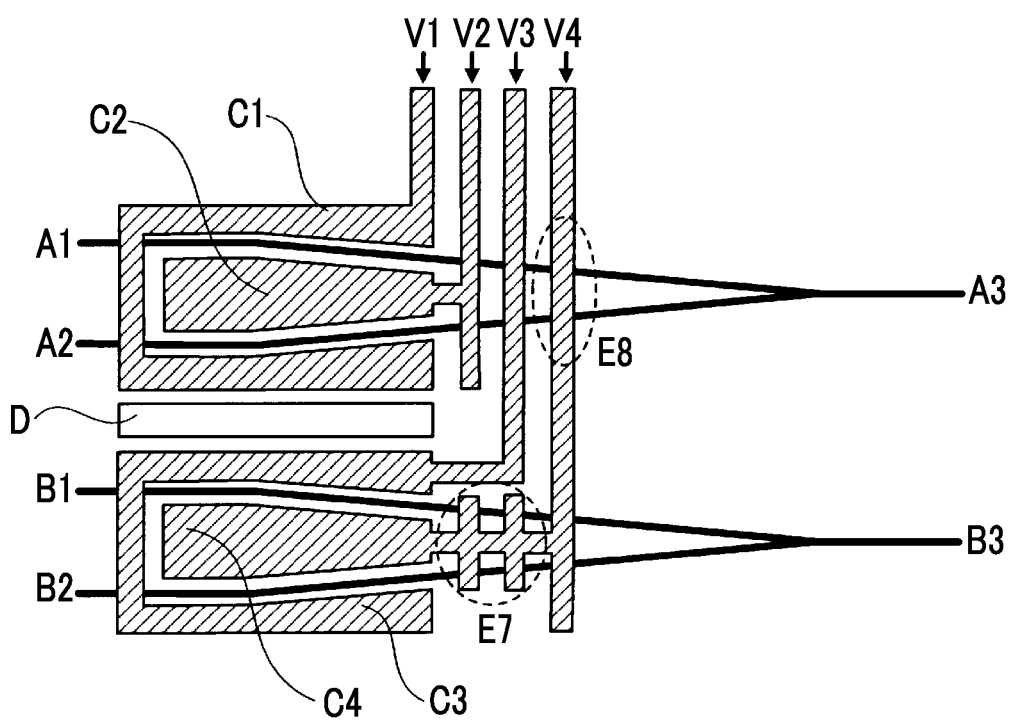
FIG. 3 is a diagram for describing a second example relating to the optical modulator according to the present invention.

FIG. 3 is a diagram for describing a second example relating to the optical modulator according to the present invention. The optical waveguide has at least two Mach-Zehnder type optical waveguides (A1 to A3 and B1 to B3) disposed side by side with each other, in which a part of the one of the two Mach-Zehnder type optical waveguides (A1 to A3) is crossed by the feeder electrode and the dummy electrode, and a second other dummy electrode (a dotted line E7) is provided at a specific position on the other one of the two Mach-Zehnder type optical waveguides (B1 to B3), which is a specific position symmetrical in relation to a position at which the feeder electrode and the dummy electrode cross the one of the two Mach-Zehnder type optical waveguides.

By adopting the configuration as shown in FIG. 3, the propagation loss of each other can be set to approximately the same level between the Mach-Zehnder type optical waveguides (A1 to A3) and the other Mach-Zehnder type optical waveguides (B1 to B3). Further, it is possible to maintain the extinction ratio when the two Mach-Zehnder type optical waveguides are combined, at high quality.

Figure 4:
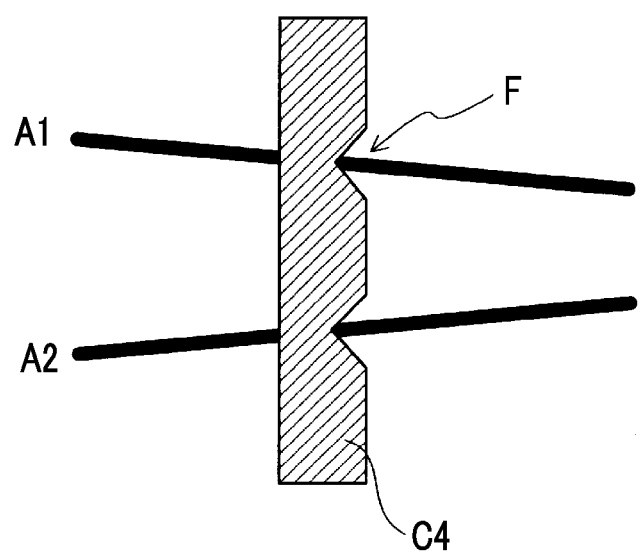
FIG. 4 is a diagram for describing a portion at which a branched waveguide and a feeder electrode intersect one another, in relation to the optical modulator according to the present invention.

Further, as a method of reducing the propagation loss of the guided light by the feeder electrode or the dummy electrode, as shown in FIG. 4 which is an enlarged view of a portion shown by a dotted line E8 of FIG. 3, the width of a portion at which the feeder electrode (or the dummy electrode) crosses each of the optical waveguides (A1 and A2) may be set to be narrower than the width of each of portions in front of and behind the portion which crosses the optical waveguide, as indicated by an arrow F.

Figure 5:
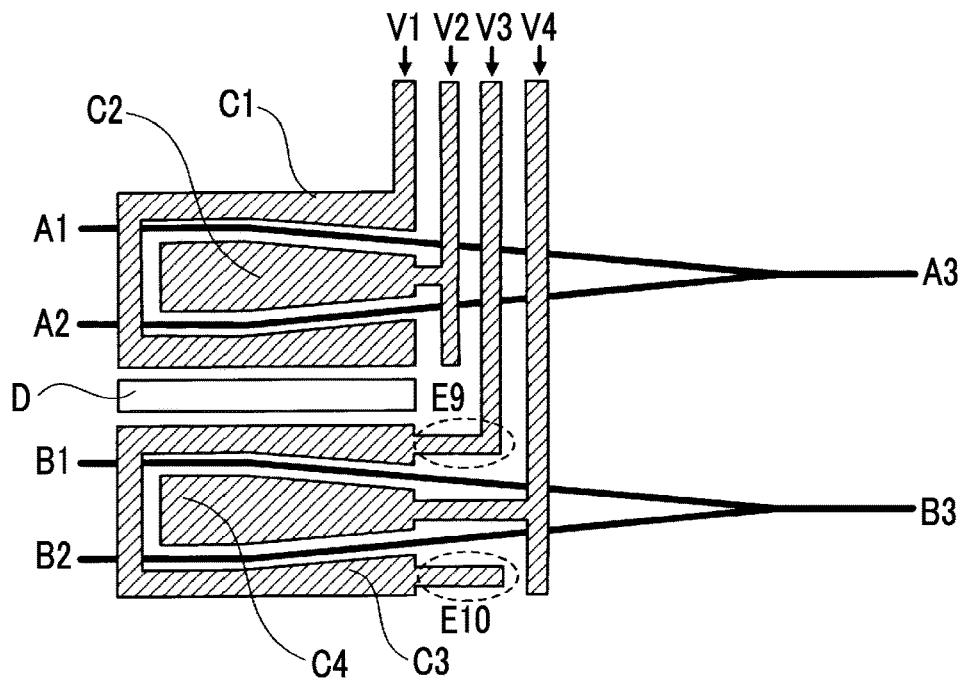
FIG. 5 is a diagram for describing a third example relating to the optical modulator according to the present invention.
Figure 6:
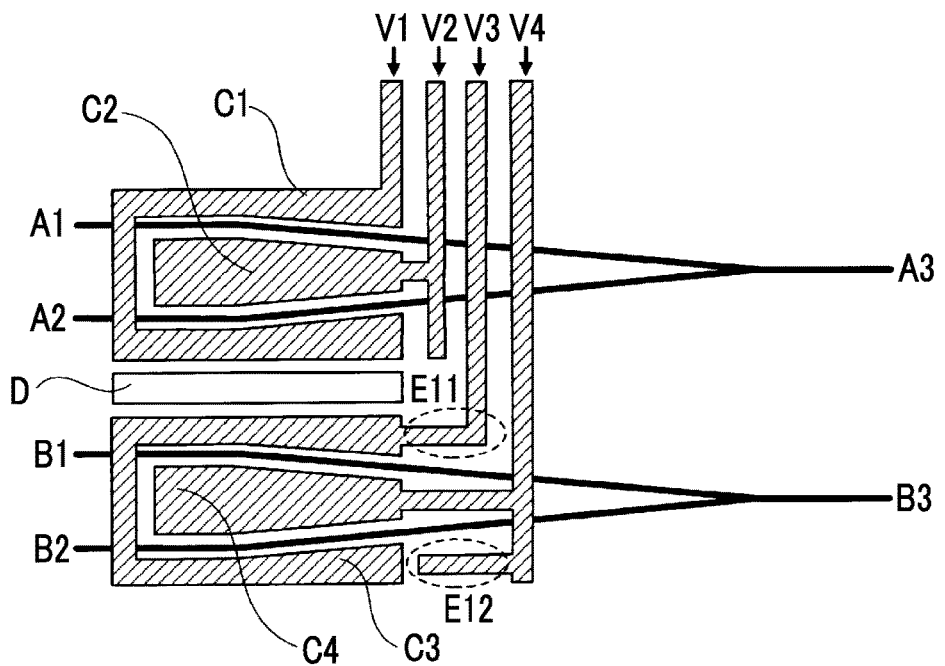
FIG. 6 is a diagram for describing a fourth example relating to the optical modulator according to the present invention.

FIGS. 5 and 6 are diagrams for describing third and fourth examples relating to the optical modulator according to the present invention. Specifically, the feeder electrode has a parallel feeder electrode portion (E9 or E11) which is disposed parallel to a drawing direction of the Mach-Zehnder type optical waveguide, and a third dummy electrode (E10 or E12) having approximately the same shape is formed at a position symmetrical to the parallel feeder electrode portion with respect to a central axis which is parallel to the drawing direction and becomes an axis of symmetry of the Mach-Zehnder type optical waveguide. Due to this configuration, it is possible to suppress the temperature drift phenomenon and to suppress the degradation of the extinction ratio.

In FIG. 5, the dummy electrode is provided on the ground electrode (C3) side, and in FIG. 6, the dummy electrode is configured on the hot electrode (C4) side. Usually, the dummy electrodes may be electrically connected to the DC electrodes (C1 to C4). Due to such a configuration, it is also possible to stabilize the potential of the dummy electrode. Further, the dummy electrode may be connected to either of the hot electrode or the ground electrode. However, in order to maintain the symmetry of the electric field which is formed by the DC electrode, the dummy electrode may be connected to the same type of electrode as the feeder electrode forming an asymmetrical shape, which becomes a cause of providing the dummy electrode.

INDUSTRIAL APPLICABILITY

As described above, according to the present invention, it is possible to provide an optical modulator in which degradation of an extinction ratio is suppressed and a temperature drift phenomenon is suppressed.

REFERENCE SIGNS LIST

A1 to A3, B1 to B3: optical waveguide
C1 to C4: DC electrode
V1 to V4: DC bias voltage
D: ground electrode
F: recessed portion

The invention claimed is:
1. An optical modulator comprising;
a substrate having an electro-optic effect;
an optical waveguide formed on the substrate; and
a control electrode for controlling light waves propagating through the optical waveguide,
wherein the optical waveguide has at least two Mach-Zehnder type optical waveguides disposed side by side with each other,
the control electrode has a DC electrode which applies DC bias to the optical waveguide,
a feeder electrode which feeds DC bias to the DC electrode crosses one of two branched waveguides of one of the two Mach-Zehnder type optical waveguides,
a first dummy electrode which neither applies DC bias to the optical waveguide as the DC electrode nor feeds DC bias to the DC electrode as the feeder electrode is provided at a specific position on the other one of the two branched waveguides, which is a specific position symmetrical in relation to a position at which the feeder electrode crosses the one of the two branched waveguides,
a part of the one of the two Mach-Zehnder type optical waveguides is crossed by the feeder electrode and the first dummy electrode, and
a second dummy electrode which neither applies DC bias to the optical waveguide as the DC electrode nor feeds DC bias to the DC electrode as the feeder electrode is provided at a specific position on the other one of the two Mach-Zehnder type optical waveguides, which is a specific position symmetrical in relation to a position at which the feeder electrode and the first dummy electrode cross the one of the two Mach-Zehnder type optical waveguides.

2. The optical modulator according to claim 1,
wherein in the feeder electrode or the dummy electrode which crosses the optical waveguide, a width of a portion which crosses the optical waveguide is made to be narrower than a width of each of portions in front of and behind the portion which crosses the optical waveguide.

3. An optical modulator comprising:
a substrate having an electro-optic effect;
an optical waveguide formed on the substrate; and
a control electrode for controlling light waves propagating through the optical waveguide,
wherein the optical waveguide has at least one Mach-Zehnder type optical waveguide,
the control electrode has a DC electrode which applies DC bias to the optical waveguide,
a feeder electrode which feeds DC bias to the DC electrode crosses one of two branched waveguides of the Mach-Zehnder type optical waveguide,
a first dummy electrode which neither applies DC bias to the optical waveguide as the DC electrode nor feeds DC bias to the DC electrode as the feeder electrode is provided at a specific position on the other one of the two branched waveguides, which is a specific position symmetrical in relation to a position at which the feeder electrode crosses the one of the two branched waveguides, the feeder electrode has a parallel feeder electrode portion which is disposed parallel to a drawing direction of the Mach-Zehnder type optical waveguide, and a third dummy electrode, which neither applies DC bias to the optical waveguide as the DC electrode nor feeds DC bias to the DC electrode as the feeder electrode, having approximately the same shape is formed at a position symmetrical to the parallel feeder electrode portion with respect to a central axis which is parallel to the drawing direction and becomes an axis of symmetry of the Mach-Zehnder type optical waveguide.

4. The optical modulator according to claim 1, wherein the dummy electrode is electrically connected to the DC electrode.

5. The optical modulator according to claim 3, wherein the dummy electrode is electrically connected to the DC electrode.

* * * * *